Oct. 14, 1924.

H. D. JAMES 1,511,344

SYSTEM OF CONTROL

Filed March 14, 1921

WITNESSES:
John W. Whiting
H. Keith

INVENTOR
Henry D. James.
BY
Wesley G. Carr
ATTORNEY

Patented Oct. 14, 1924.

1,511,344

UNITED STATES PATENT OFFICE.

HENRY D. JAMES, OF EDGEWOOD, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed March 14, 1921. Serial No. 452,212.

*To all whom it may concern:*

Be it known that I, HENRY D. JAMES, a citizen of the United States, and a resident of Edgewood, in the county of Allegheny and State of Pennsylvania, have invented a new and useful Improvement in Systems of Control, of which the following is a specification.

My invention relates to motor control systems and has particular relation to such systems as embody auto-starters.

An object of my invention is to provide a system of remote control for starting and controlling induction motors of the squirrel-cage type.

Another object of my invention is to provide means for transferring the motor from the auto-transformer connections directly to the line connections without interrupting the motor circuit.

Systems are commonly employed in which the motor is connected through the auto-transformer to the supply circuit. The motor is first connected to sections of the transformer windings which supply a suitably reduced voltage in starting the motor from rest. When the motor has attained a certain speed and developed a sufficient counter-electromotive force, it is connected directly to the supply source and the transformer windings are excluded.

I propose to connect an induction motor in shunt relation to portions of the windings of an auto-transformer and to connect these windings by switching means in such manner that, after the motor has accelerated to a predetermined speed, the shunt circuit through these windings is interrupted and current flows through portions of the transformer windings and through the motor windings in series relation. This series relation of windings is employed momentarily in transition from the "starting" to the "running" connections of the motor.

I propose to use a time-limiting device, a current-limiting device, or any other suitable means for insuring proper acceleration of the motor.

My invention will be described in connection with the accompanying drawing, in which—

Figure 1:
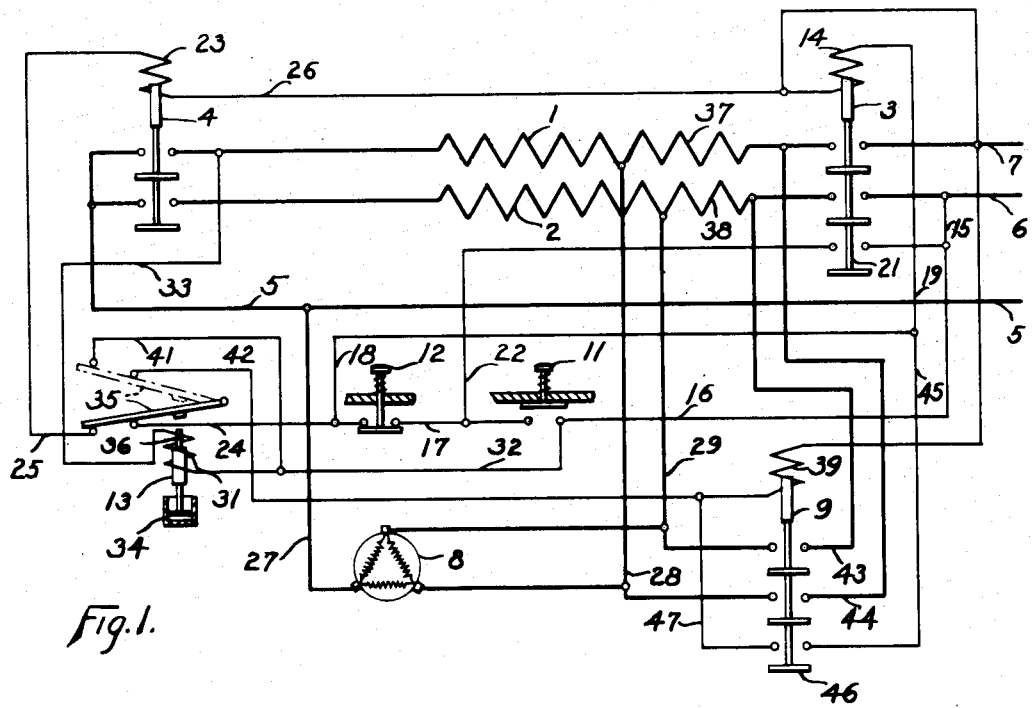
Figure 1 is a diagrammatic view of circuits and apparatus embodying my invention.

Referring particularly to Fig. 1, an auto-transformer having windings 1 and 2 is connected through line contactors 3 and 4 to line conductors 5, 6 and 7. An induction motor 8 of the squirrel-cage type is arranged for connection, selectively, to the auto-transformer windings 1 and 2, or through contactors 9 and 3, directly to the line conductors 5, 6 and 7. Push-button switches 11 and 12 and a time-limit relay 13, of the transfer type, automatically control the contactors and circuits through the motor.

The momentary closure of push-button switch 11 establishes a circuit for the operating coil 14 of contactor 3, extending from line conductor 6 through conductors 15 and 16, push-button switch 11, conductor 17, push-button switch 12, conductors 18 and 19 and coil 14 to the line conductor 7. An interlock 21 is attached to, and operated by, contactor 3 and the closure of contactor 3 establishes a holding circuit for its coil 14, extending from conductor 6 through conductor 15, interlock 21, conductors 22 and 17, push-button switch 12, conductors 18 and 19 and coil 14 to the line conductor 7.

Simultaneously with the energization of coil 14, a circuit is established for coil 23 of contactor 4, extending from line conductor 6 through conductors 15 and 16, push-button switch 11, conductor 17, push-button switch 12, conductor 24, relay 13, conductor 25, coil 23 and conductor 26 to line conductor 7.

The closure of contactor 4 connects auto-transformer windings 1 and 2 to the line conductor 5. A holding circuit for coil 23 extends from conductor 6 through conductor 15, interlock 21, conductors 22 and 17, push-button switch 12, conductor 24, relay 13, conductor 25, coil 23 and conductor 26 to the line conductor 7.

The motor 8 is now connected by conductors 27, 28 and 29 to a source of low voltage supplied by transformer windings 1 and 2 in a well-known manner. Upon the closure of contactor 4 a circuit is established for coil 31 of the relay 13, extending from line conductor 6 through conductors 15, 16 and 32, coil 31, conductor 33 and contactor 4 to the line conductor 5. The operation of relay 13 is retarded by an adjustable dashpot 34, the functioning of which is well known. After a predetermined time interval, the contact member 35 of relay 13 is transferred to its upper or dotted line position by the engagement of plunger 36, causing member 35 to disengage from the lower contact members to interrupt a circuit through coil 23 previously traced and to open contactor 4.

It may be assumed that the motor 8 has been accelerated to a predetermined degree previous to the transfer of relay contact member 35. The opening of contactor 4 interrupts the shunt relation of motor 8 with the auto-transformer windings 1 and 2, and a series relation is established, extending through sections 37 and 38 of the auto-transformer windings. The motor 8 is connected directly, as before, to line conductor 5 through conductor 27 and to line conductors 6 and 7 through conductors 28 and 29, auto-transformer windings 37 and 38 and line contactor 3. These series connections of the motor are but momentary during the transition from "starting" to "running" connections.

Upon the transfer of relay 13 to its upper or dotted line position, a circuit is established for the coil 39 of contactor 9, extending from line conductor 6 through conductors 15, 16, 32 and 41, relay 13, conductor 42 and coil 39 to line conductor 7. Contactor 9 closes to establish a shunt circuit which excludes transformer windings 37 and 38 and to connect the motor 8 directly to line conductors 6 and 7, through contactor 9, conductors 43 and 44 and contactor 3. An interlock 46, which is attached to, and operated by, contactor 9, establishes a holding circuit for coil 39 of contactor 9 extending from conductor 6 through conductor 15, interlock 21, conductors 22 and 17, push-button switch 12, conductors 18 and 45, interlock 46, conductor 47 and coil 39 to line conductor 7.

The motor may be stopped at any time by means of push-button switch 12 which operates to interrupt circuits of coils 14, 23, 39 and 31 and to restore the respective contactors 3, 4 and 9 and the relay 13 to their initial positions.

Figure 2:
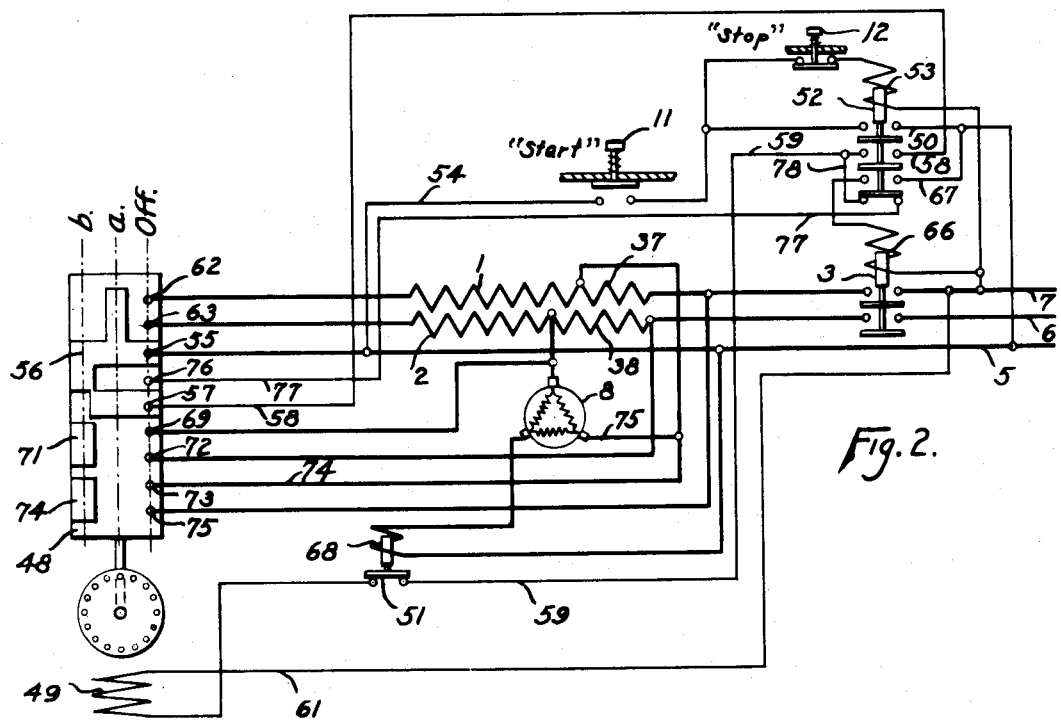
Fig. 2 is a diagrammatic view of a modification of the system shown in Fig. 1.

Referring to Fig. 2, the motor 8 is similarly connected to transformer windings 1 and 2 by means of a pilot-motor-operated controller 48. The pilot motor is shown, for convenience, as of the squirrel-cage type, having a primary winding 49 controlled by the current-limiting relay 51, and a remotely controlled relay 52 which also controls the line contactor 3.

The operation of push-button switch 11 establishes a circuit for the coil 53 of relay 52, extending from line conductor 5 through conductor 54, push-button switches 11 and 12, and coil 53 to line conductor 7. Relay 52 closes to establish a circuit for the pilot motor winding 49, extending from line conductor 5 through contact members 55, 56 and 57, conductor 58, contactor 52, conductor 59, relay 51, motor winding 49 and conductor 61 to line conductor 7. A holding circuit is established for coil 53 of relay 52, extending from conductor 5 through conductor 50, relay 52, push-button switch 12 and coil 53 to line conductor 7. The controller 48 is actuated to position "a," establishing connections for the auto-transformer windings 1 and 2, extending through contact members 62, 56, 63 and 55 to the line conductor 5. The coil 66 of line contactor 3 is energized by a circuit extending from line conductor 7 through coil 66, relay 52 and conductor 67 to line conductor 5. The closure of line contactor 3 completes a shunt circuit for the motor 8 comprising portions of auto-transformer windings 1 and 2, similar to the connections established in Fig. 1.

Coil 68 of relay 51 is in series with windings of motor 8 to effect the interruption of the circuit of the pilot motor winding 49, controller 48 remaining in position "a" until the motor 8 has accelerated and has developed counter-electromotive force to sufficiently reduce the current traversing coil 68. Thereafter, relay 51 reestablishes the circuit of pilot motor 49 and actuates controller 48 to position "b." In position "b," contact members 56 and 57 are disengaged, interrupting the circuit of the pilot motor previously traced. Contact members 62, 56 and 63 are also disengaged, interrupting the shunt circuit relation of motor 8 to transformer windings 1 and 2. A circuit through motor 8 is therefore established with connections similar to those described in Fig. 1, which include transformer sections 37 and 38. These connections are established in transition from the "starting" to the "running" connections for the motor 8, in which contact members 69, 71 and 72 engage to exclude transformer winding 37 and transformer winding 38 is excluded by the engagement of contact members 73, 74 and 75.

The motor 8 is now connected to line conductors 5, 6 and 7 and it continues to operate until its circuit is interrupted by push-button switch 12 which effects the opening of relay 52 and line contactor 3. The opening of relay 52 again establishes a circuit for the pilot motor winding 49, extending from line conductor 5 through contact members 55, 56 and 76, conductor 77, relay 52, conductors 78 and 59, relay 51, pilot motor winding 49 and conductor 61 to line conductor 7. The pilot motor then actuates controller 48 to its "off" position, in which contact members 55, 56 and 76 are disengaged and the pilot motor circuit is interrupted.

I have described systems of control for an induction motor of the squirrel-cage type which are simple and in which the motor circuit is uninterrupted in changing from the "starting" to the "running" connections. Such system is especially desirable when applied to motors of fairly large capacity.

I claim as my invention:—

1. The combination with an alternating current motor and controlling means therefor comprising an auto-transformer, of electro-magnetically operable means for automatically directly connecting the primary winding of the motor first in shunt and then in series relation to sections of the windings of said auto-transformer and finally excluding said auto-transformer, and current-limit means for controlling said operation.

2. The combination with an alternating current motor and accelerating means therefor comprising an auto-transformer, of electro-magnetically operable means for automatically directly connecting the primary winding of the motor in shunt and in series relation to sections of the winding of said auto-transformer, and for disconnecting said auto-transformer, and load-responsive means for controlling the rate of acceleration.

3. The combination with an alternating current motor and an auto-transformer, of electro-magnetically operable means for automatically connecting the motor and the transformer directly in shunt and in series relation and for excluding said transformer from the circuit of said motor, and load responsive means for controlling said means.

4. The combination with an alternating current motor and an auto-transformer, of electro-responsive means for selectively connecting the motor and the transformer directly in shunt and in series relation and for excluding said transformer from the circuit of said motor, and a current-limit relay for controlling said means.

5. The combination with an alternating current motor and an auto-transformer, of electro-responsive means for connecting the motor and the transformer directly in shunt or in series relation and automatic means whereby said transformer is excluded from the circuit of said motor, and load-responsive means for controlling said automatic means.

6. The combination with an alternating current motor and a source of energy, of an auto-transformer, and electro-responsive means for connecting the auto-transformer to the source of energy, for automatically connecting said motor directly to said auto-transformer and to said source of energy without disconnecting said motor from said source of energy, and load-responsive means for controlling said means.

7. The combination with an alternating current motor and an auto-transformer, of a source of energy, a line contactor, and a pilot-motor-operated controller for connecting said auto-transformer to the source of energy and for first connecting the motor in shunt and then in direct series relation to portions of the windings of said auto-transformer and for excluding said auto-transformer, a remotely controlled relay for controlling said selective motor connections, and means for automatically controlling said pilot motor.

In testimony whereof, I have hereunto subscribed my name this 7th day of March, 1921.

HENRY D. JAMES.